United States Patent
Shibata et al.

(10) Patent No.: US 11,758,110 B2
(45) Date of Patent: Sep. 12, 2023

(54) CAMERA CALIBRATION INFORMATION ACQUISITION DEVICE, IMAGE PROCESSING DEVICE, CAMERA CALIBRATION INFORMATION ACQUISITION METHOD, AND RECORDING MEDIUM

(71) Applicants: NEC CORPORATION, Tokyo (JP); TOKYO INSTITUTE OF TECHNOLOGY, Tokyo (JP)

(72) Inventors: Takashi Shibata, Tokyo (JP); Masatoshi Okutomi, Tokyo (JP); Masayuki Tanaka, Tokyo (JP); Thapanapong Rukkanchanunt, Tokyo (JP)

(73) Assignees: NEC CORPORATION, Tokyo (JP); TOKYO INSTITUTE OF TECHNOLOGY, Tokyo (JP)

( * ) Notice: Subject to any disclaimer, the term of this patent is extended or adjusted under 35 U.S.C. 154(b) by 203 days.

(21) Appl. No.: 17/432,795

(22) PCT Filed: Feb. 27, 2020

(86) PCT No.: PCT/JP2020/008034
§ 371 (c)(1),
(2) Date: Aug. 20, 2021

(87) PCT Pub. No.: WO2020/175621
PCT Pub. Date: Sep. 3, 2020

(65) Prior Publication Data
US 2022/0132092 A1    Apr. 28, 2022

(30) Foreign Application Priority Data
Feb. 28, 2019  (JP) .................... 2019-036372

(51) Int. Cl.
H04N 13/246    (2018.01)
G06T 7/80      (2017.01)
G06V 10/25     (2022.01)

(52) U.S. Cl.
CPC ............. H04N 13/246 (2018.05); G06T 7/85 (2017.01); G06V 10/25 (2022.01)

(58) Field of Classification Search
CPC ....... G06T 7/85; H04N 13/327; H04N 13/246
See application file for complete search history.

(56) References Cited

U.S. PATENT DOCUMENTS

2015/0109418 A1* 4/2015 Lin .................... G01B 11/2522
                                                      348/47
2018/0281698 A1* 10/2018 Tang ...................... G06T 7/80

FOREIGN PATENT DOCUMENTS

JP  2016-017913 A    2/2016
WO  2006/120759 A1   11/2006
WO  2017/056473 A1   4/2017

OTHER PUBLICATIONS

Takashi Shibata et al., "Joint geometric calibration of visible and far-infrared cameras and its applications", Image Laboratory, Apr. 10, 2018, pp. 49-54.

(Continued)

Primary Examiner — Xiaolan Xu
(74) Attorney, Agent, or Firm — Sughrue Mion, PLLC (57) ABSTRACT

A camera calibration information acquisition device acquires captured images of a camera calibration target from two or more cameras, detects, from each image, a coordinate of a feature point in the image, calculates—an internal parameter for each camera by using the feature point, calculates, for each camera, a magnitude of error in the coordinate of the feature point, calculates a value for an external parameter of the cameras by using the magnitude of the error, the coordinate of the feature point, and an error (Continued)

function set so that a penalty for error in calculating the external parameter decreases as the magnitude of the error in the coordinate of the feature point in the image increases.

6 Claims, 6 Drawing Sheets

(56) References Cited

OTHER PUBLICATIONS

Zhengyou Zhang et al., "A Flexible New Technique for Camera Calibration", IEEE Transactions on Pattern Analysis and Machine Intelligence, Nov. 2000, pp. 1330-1334, vol. 22, No. 11.
Soonmin Hwang et al., "Multispectral Pedestrian Detection: Benchmark Dataset and Baseline", 2015 IEEE, Conference on Computer Vision and Pattern Recognition, 2015, pp. 1037-1045.
Takashi Shibata et al., "Accurate Joint Geometric Camera Calibration of Visible and Far-Infrared Cameras", IS&T International Symposium on Electronic Imaging 2017, Image Sensors and Imaging Systems 2017, 2017, pp. 1-7.
Takashi Shibata et al., "Gradient-Domain Image Reconstruction Framework with Intensity-Range and Base-Structure Constraints", 2016 IEEE Conference on Computer Vision and Pattern Recognition, 2016, pp. 2745-2753.
International Search Report for PCT/JP2020/008034, dated May 19, 2020.

\* cited by examiner

CAMERA CALIBRATION INFORMATION ACQUISITION DEVICE, IMAGE PROCESSING DEVICE, CAMERA CALIBRATION INFORMATION ACQUISITION METHOD, AND RECORDING MEDIUM

CROSS REFERENCE TO RELATED APPLICATIONS

This application is a National Stage of International Application No. PCT/JP2020/008034 filed Feb. 27, 2020, claiming priority based on Japanese Patent Application No. 2019-036372 filed Feb. 28, 2019.

TECHNICAL FIELD

The present invention relates to a camera calibration information acquisition device, an image processing device, a camera calibration information acquisition method, and a recording medium.

BACKGROUND ART

In image recognition, it is known that, compared to the use of a single modal (for example, a visible image), the use of information from an additional modal (for example, a far-infrared image) enables a wider variety of scenes to be handled and the accuracy to be improved. The additional modal image is often obtained from a different camera, resulting in parallax. As a result, the same object in real space appears with a positional displacement in the images of the different cameras.

In order to solve this problem, Non-Patent Document 1 uses data in which parallax has been removed by aligning the optical axes of the visible camera and the far-infrared camera with a special device. However, the removal of parallax with a special device results in a high cost. When such a special device is not used, it is necessary to align the images by correcting the positional displacement in the images of the different cameras by camera calibration.

In terms of camera calibration, Non-Patent Document 2 discloses a method of performing camera calibration with respect to an image of a visible camera and an image of a far-infrared camera having different optical axes.

PRIOR ART DOCUMENTS

Non-Patent Documents

[Non-Patent Document 1] Soonmin Hwang and 4 others, "Multispectral Pedestrian Detection: Benchmark Dataset and Baseline", 2015 IEEE Conference on Computer Vision and Pattern Recognition, 2015

[Non-Patent Document 2] Shibata and 2 others, "Accurate Joint Geometric Camera Calibration of Visible and Far-Infrared Cameras", IS&T International Symposium on Electronic Imaging 2017, 2017

SUMMARY OF THE INVENTION

Problem to be Solved by the Invention

When the images of a plurality of cameras having different optical axes are corrected by a method such as that described in Non-Patent Document 2, and the accuracy of the information obtained from the captured images differs depending on the camera, it is preferable that the decrease in camera calibration accuracy caused by the difference in accuracy can be reduced.

The present invention has an object of providing a camera calibration information acquisition device, an image processing device, a camera calibration information acquisition method, and a recording medium which are capable of solving the problem described above.

Means for Solving the Problem

According to a first example aspect of the present invention, a camera calibration information acquisition device includes: an image acquisition means for acquiring captured images of a camera calibration target from two or more cameras; a feature point detection means for detecting, from each image acquired by the image acquisition means, a coordinate of a feature point in the image; an internal parameter estimation means for calculating an internal parameter for each camera by using the feature point detected by the feature point detection means; an error level estimation means for calculating, for each camera, a magnitude of error in the coordinate of the feature point detected by the feature point detection means; and an external parameter estimation means for calculating a value for an external parameter of the cameras by using the magnitude of the error calculated by the error level estimation means, the coordinate of the feature point detected by the feature point detection means, and an error function set so that a penalty for error in calculating the external parameter decreases as the magnitude of the error in the coordinate of the feature point in the image increases.

According to a second example aspect of the present invention, a camera calibration information acquisition method includes the steps of: acquiring captured images of a camera calibration target from two or more cameras; detecting, from each acquired image, a coordinate of a feature point in the image; calculating an internal parameter for each camera by using the detected feature point; calculating, for each camera, a magnitude of error in the coordinate of the detected feature point; and calculating a value for an external parameter of the cameras by using the calculated magnitude of the error, the detected coordinate of the feature point, and an error function set so that a penalty for error in calculating the external parameter decreases as the magnitude of the error in the coordinate of the feature point in the image increases.

According to a third example aspect of the present invention, a recording medium stores a program for causing a computer to execute the steps of: acquiring captured images of a camera calibration target from two or more cameras; detecting, from each acquired image, a coordinate of a feature point in the image; calculating an internal parameter for each camera by using the feature points detected by the feature point detection unit; calculating, for each camera, a magnitude of error in the coordinate of the detected feature point; and calculating a value for an external parameter of the cameras by using the calculated magnitude of the error, the detected coordinate of the feature point, and an error function set so that a penalty for error in calculating the external parameter decreases as the magnitude of the error in the coordinate of the feature point in the image increases.

Effect of the Invention

According to the present invention, when the accuracy of the information obtained from the captured images differs depending on the camera, it is possible to reduce the decrease in camera calibration accuracy caused by the difference in accuracy.

EXAMPLE EMBODIMENT

Hereunder, example embodiments of the present embodiment will be described. However, the following example embodiments do not limit the invention according to the claims. Furthermore, all combinations of features described in the example embodiments may not be essential to the solution means of the invention.

Figure 1:
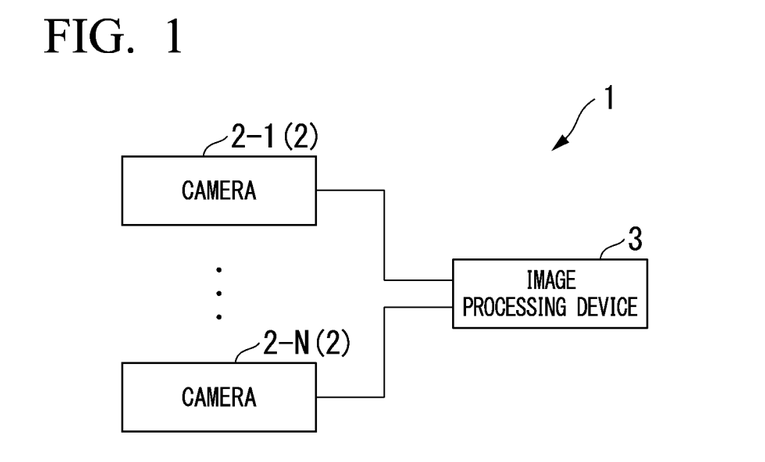
FIG. 1 is a schematic configuration diagram showing an example of a device configuration of an image processing system according to an example embodiment.

FIG. 1 is a schematic configuration diagram showing an example of a device configuration of an image processing system according to an example embodiment. In the configuration shown in FIG. 1, the image processing system 1 includes N cameras 2-1 to 2-N and an image processing device 3. The cameras 2-1 to 2-N are collectively referred to as cameras 2.

Each of the cameras 2 captures an image, and transmits the captured image that has been obtained to the image processing device 3 as image data. The plurality of cameras 2 capture the images such that, between cameras, at least part of the images overlap each other.

Each of the cameras 2 is not limited to being a visible light camera (a camera that images visible light). For example, various cameras such as infrared cameras or thermography cameras that acquire images or sensor measurement values corresponding to a spatial expanse can be used as the cameras 2.

The number of cameras included in the image processing system 1 may be two or more. That is to say, N may be an integer such that N≥2.

The image processing device 3 collectively performs camera calibration on a plurality of images captured by the plurality of cameras 2, aligns the images, and synthesizes an image in which the images are superimposed.

The image processing device 3 is configured using a computer such as a personal computer (PC) or a workstation.

Figure 2:
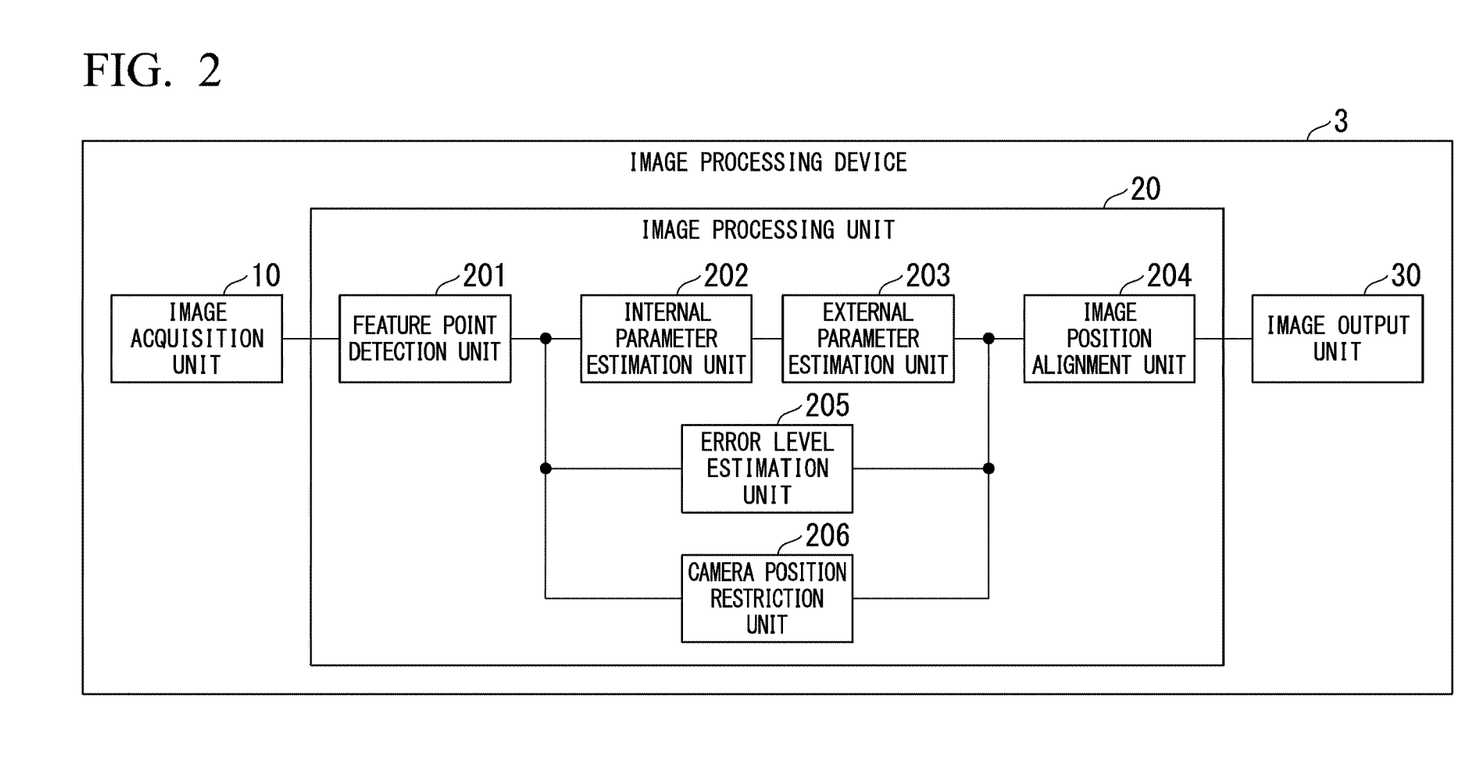
FIG. 2 is a schematic block diagram showing an example of a functional configuration of an image processing device according to the example embodiment.

FIG. 2 is a schematic block diagram showing an example of a functional configuration of the image processing device 3. In the configuration shown in FIG. 2, the image processing device 3 includes an image acquisition unit (image acquisition means) 10, an image processing unit (image processing means) 20, and an image output unit (image output means) 30. The image processing unit 20 includes a feature point detection unit (feature point detection means) 201, an internal parameter estimation unit (internal parameter estimation means) 202, an external parameter estimation unit (external parameter estimation means) 203, an image position alignment unit (image position alignment means) 204, an error level estimation unit (error level estimation means) 205, and a camera position restriction unit (camera position restriction means) 206.

Each unit of the image processing device will be described.

Image Acquisition Unit 10:

The image acquisition unit 10 acquires one or more images of a camera calibration target captured from each of two or more cameras 2. The plurality of images obtained by the plurality of cameras 2 are input to the image acquisition unit 10. The images acquired by the image acquisition unit 10 are not limited to visible images. For example, when the camera 2 is a thermography camera, the images acquired by the image acquisition unit 10 may be images in which sensing data is represented as a two-dimensional image. More specifically, the images acquired by the image acquisition unit 10 may include temperature images (an image showing the temperature distribution in the capture area) or a depth image (an image showing the depth in the capture area).

Then, the image acquisition unit 10 records the input images or measurement values in a memory or the like provided in the image processing device 3. The images acquired by the image acquisition unit 10 are not limited to this. For example, a processing result obtained during deep learning may be input to the image acquisition unit 10 as a multi-channel image. Alternatively, vector data (such as a velocity field or a density field) calculated by a numerical simulation or the like may be input to the image acquisition unit 10 as a multi-channel image. Hereunder, the plurality of images acquired by the image acquisition unit 10 are collectively referred to as calibration images.

The camera calibration target (imaging target) of the image processing device 3 is not limited to a specific target. For example, the calibration target described in Non-Patent Document 2 may be used as the camera calibration target of the image processing device 3, or a more general object may be used as the camera calibration target.

Feature Point Detection Unit 201:

The feature point detection unit 201 detects, from each of the plurality of images acquired by the image acquisition unit 10, the coordinates of feature points to be used for camera calibration. The method used by the feature point detection unit 201 to detect the coordinates of the feature points is not limited to a specific method, and various known methods can be used.

For example, the feature point detection unit 201 may detect the coordinates of the feature points using a method such as Harris corner point detection. Alternatively, the feature point detection unit 201 may detect the coordinates of the feature points from images in which the calibration target is captured by using a feature point detection such as a SIFT (Scale Invariant Feature Transform). That is to say, the coordinates of the feature points of the images may be detected by using a general method that detects the coordinates of the feature points from the corners and contours of the images and the like.

Alternatively, the feature point detection unit 201 may acquire the coordinates of feature points that have been manually detected by the user. Alternatively, the feature point detection unit 201 may detect the coordinates of the feature points by combining the coordinates of the feature points manually input by the user and the coordinates of the feature points automatically detected by using Harris corner point detection or the like. For example, the feature point detection unit 201 may first automatically detect the coordinates of the feature points using Harris corner point detection and the like, and these may then be manually corrected. Alternatively, an average value of the coordinates of the feature points automatically detected by the feature point detection unit 201 and the coordinates of the feature points manually input by the user may be used as the coordinates of the feature points.

Here, each camera is distinguished with an index i ($i=1, \ldots, N$) (where N indicates the number of cameras). Each corner point of the calibration target is distinguished with an index j ($j=1, \ldots, P$) (where P indicates the number of corner points). The posture of each calibration target is distinguished with an index k ($k=1, \ldots, M$) (where M indicates the number of calibration target postures). In this case, each feature point can be distinguished by the index i of the camera, the index j of each corner point of the calibration target, and the index k of the posture of each calibration target. Hereunder, each feature point is represented by $x(i, j, k)$ to distinguish between them. The coordinates of the feature points $x(i, j, k)$ are also expressed as $x(i, j, k)$. However, i, j, and k are indexes as described above, and do not directly indicate the coordinate values.

Internal Parameter Estimation Unit 202:

The internal parameter estimation unit 202 calculates (estimates) an internal parameter value for each camera 2 using the coordinates of the feature points detected by the feature point detection unit 201. Of the camera parameters (parameters for aligning the camera image), the internal parameter referred to here is a parameter which arises due to the characteristics or state of the camera 2 itself, such as lens distortion and the optical center. That is to say, the camera parameters here are classified into external parameters (relative posture of the camera) which arise due to the camera arrangement (position and orientation), and internal parameters which do not depend on the camera arrangement (such as lens distortion and the optical center).

For example, the internal parameter estimation unit 202 includes internal parameters such as lens distortions and optical centers as model parameters in advance, and includes in advance (stores in advance, for example) a model (hereunder, referred to as a camera model) representing the relationship between the cameras and the coordinates in the images captured by the cameras (specifically, the relationship between the internal parameter values and the coordinates in a captured image). Then, the internal parameter estimation unit 202 calculates camera model parameters (internal parameters) that reduce the magnitude of the difference between the coordinates of the feature points calculated from the camera model and the coordinates of the feature points detected by the feature point detection unit 201.

Further, for example, the internal parameter estimation unit 202 defines an error between the coordinates of the feature points calculated from the camera model and the coordinates of the feature points detected by the feature point detection unit 201 by a squared error or the like, and calculates the camera model parameters using the least squares method or the like so that the error is minimized.

In the following, each camera is distinguished by the index i ($i=1, \ldots, N$), and the internal parameters of each camera are denoted by $K_i$.

Image Position Alignment Unit 204:

The image position alignment unit 204 aligns the position of the image acquired by each of the cameras 2 based on the internal parameters calculated by the internal parameter estimation unit 202 and the external parameters calculated by the external parameter estimation unit 203 described below. More specifically, the image position alignment unit 204 uses the internal parameters (camera lens distortion and the image center) and external parameters (relative posture of the camera) calculated by the internal parameter estimation unit 202 and the external parameter estimation unit 203 to generate an image in which the positional displacement of each image having a difference in resolution and a positional displacement has been corrected.

In the overlapping sections of images captured by different cameras, the image position alignment unit 204 may average the image values of both images at each pixel after the image alignment processing in order to generate a smoother image at the image boundaries. Alternatively, the image position alignment unit 204 may generate the aligned image using a gradient-based image. The gradient-based method in this case may use, for example, the method described in the following Non-Patent Document, but the method is not limited thereto.

Non-Patent Document: Shibata and 2 others, "Gradient-Domain Image Reconstruction Framework with Intensity-Range and Base-Structure Constraints.", 2016 IEEE Conference on Computer Vision and Pattern Recognition, 2016

Error Level Estimation Unit 205:

The error level estimation unit 205 calculates (estimates), for each camera 2, an error level of the feature point detection performed by the feature point detection unit 201 (error level of the coordinates of the feature points) based on the feature points detected by the feature point detection unit 201 and the camera images and camera information acquired by the image acquisition unit 10. The error level referred to here is the magnitude of the error.

For example, the error level estimation unit 205 may calculate the error level by using the camera resolution as the camera information. Specifically, the error level estimation unit 205 may estimate the error level such that the error level is larger when the resolution of the camera 2 is low.

For example, far-infrared cameras generally have a higher resolution than visible cameras. In view of such a characteristic, the error level of the coordinates of the feature points of each camera 2 may be estimated by the error level estimation unit 205 such that the error level of the coordinates of the feature points obtained from images acquired by visible cameras is smaller than the error level of the coordinates of the feature points obtained from images acquired by far-infrared cameras.

Alternatively, the error level estimation unit 205 may acquire, separately from the images acquired by the image acquisition unit 10, and in advance, images captured of the calibration target and the true values of the coordinates of the feature points in the images. Then, the error level estimation unit 205 may directly calculate the error level from the difference between the coordinates of the feature points in the images acquired by the image acquisition unit 10 and the true values of the coordinates of the feature points acquired in advance.

Alternatively, the error level estimation unit 205 may calculate the error level from the relationship between the appearance of an image and the true value by using a method such as machine learning.

Alternatively, the error level estimation unit 205 may acquire, separately from the image acquired by the image acquisition unit 10, and in advance, images captured of the calibration target and values of the coordinates of the feature points in the images that have been manually input by the user. Then, the error level estimation unit 205 may calculate the error level from the difference between the coordinates of the feature points in the images acquired by the image acquisition unit 10 and the coordinates of the feature points (manually input values) acquired in advance.

As mentioned above, each camera 2 is distinguished with an index i (where i=1, . . . , N). Each corner point of the calibration target is distinguished with an index j (i=1, . . . , P). The posture of each calibration target is distinguished with an index k (k=1, . . . M). In this case, the error level corresponding to the coordinates of each feature point can be distinguished by the index i of the camera, the index j of each corner point of the calibration target, and the index k of the posture of each calibration target. Hereunder, the error level of each feature point is denoted by $\theta(i, j, k)$.

External Parameter Estimation Unit 203:

The external parameter estimation unit 203 calculates (estimates) an external parameter of each camera 2 based on the error level calculated by the error level estimation unit 205, the coordinates of the feature points detected by the feature point detection unit 201, and the internal parameter calculated by the internal parameter estimation unit 202. At this time, the external parameter estimation unit 203 sets an error function so that the penalty of the error level decreases as the error level of the coordinates of the feature points in an image increases, and calculates, for example, the external parameter that minimizes the value of the error function.

Here, the posture of the camera can generally be expressed by the rotation and translation of the camera.

As described above, each camera 2 is distinguished with an index i (where i=1, . . . , N). Each corner point of the calibration target is distinguished with an index j (i=1, . . . , P). Assuming a rotation between a camera i and a calibration target j is expressed as $R_k^i$, and a rotation from the reference camera (the camera in which i=1) to the ith camera is expressed as $R_i$, a relational expression such as equation (1) is established.

[Equation 1]

$$R_k^i = R_i R_k^1 \qquad (1)$$

Furthermore, assuming a translation between a camera i and a calibration target j is expressed as $T_k^i$, and a translation from the reference camera (the camera in which i=1) to the ith camera is expressed as $T_i$, a relational expression such as equation (2) is established.

[Equation 2]

$$T_k^i = R_i T_k^1 + T_i \qquad (2)$$

At this time, in an ideal case (that is to say, if the influence of the error can be ignored) the relational expression in equation (3) is established between the internal parameters and external parameters of the cameras, and the coordinates of the feature points.

[Equation 3]

$$w(i,j,k) \cdot x(i,j,k) = K_i[R_k^i X_j + T_k^i] \qquad (3)$$

Here, w(i, j, k) is a scale factor of the image in projective geometry. Further, $X_j$ indicates a coordinate value in a three-dimensional world coordinate system.

At this time, the error function for calculating the external parameters can be expressed by equation (4) using the error level $\theta(i, j, k)$ of the feature points obtained by the error level estimation unit 205.

[Equation 4]

$$E = \sum_{i,j,k} f(\theta(i, j, k)) \left| \frac{K_i[R_k^i X_j + T_k^i]}{w(i, j, k)} - x(i, j, k) \right|_2^2 \qquad (4)$$

Here, f( ) is a function for adjusting the error level and the weight of the penalty. The error function (in particular, the function $f(\theta(i, j, k))$) is set so that the penalty of the error level in the external parameter estimation unit 203 decreases as the error level of the feature points in an image increases. The superscript "2" in equation (4) represents squaring, and the subscript "2" indicates the L2 norm.

For example, "$f(\theta(i, j, k))|K_i[R_k^i X_j + T_k^i]/w(i,j,k) - x(i, j, k)|_2^2$" in equation (4) corresponds to an example of the penalty of the error level. Further, the function $f(\theta(i, j, k))$ may be set so that the value of the function $f(\theta(i, j, k))$ decreases as the error level $\theta(i, j, k)$ of the feature points increases.

The external parameter estimation unit 203 is capable of calculating the external parameters by minimizing the value E of the error function shown in equation (4).

Here, as described above, in an ideal case the relational expression in equation (3) is established between the internal parameters and external parameters of the cameras, and the coordinates of the feature points. On the other hand, if the error included in the coordinates of the feature points cannot be ignored and/or the error included in the internal parameters cannot be ignored, when the value of the external parameters are calculated based on the coordinates of the feature points and the values of the internal parameters using the relationship of equation (3), the obtained values of the external parameters are affected by the error included in the coordinates of the feature points and the error included in the values of the internal parameters.

In the case of equation (4), the closer the value of "$K_i[R_k^i X_j + T_k^i]/w(i, j, k) - x(i, j, k)$" is to 0, the more the values of the external parameters are affected by the error included in the coordinates of the feature points and the error included in the values of the internal parameters. In other words, it is considered that the error included in the coordinates of the feature points and the error included in the value of the internal parameters may propagate to the error included in the values of the external parameters, and the error included in the values of the external parameters may become large.

Then, as described above, the external parameter estimation unit 203 performs a calculation so that the penalty of the error level decreases as the error level $\theta(i, j, k)$ of the coordinates of the feature points increases. As a result, it is possible to reduce the deterioration in the accuracy of the values of the external parameters (relatively improve the accuracy of the values of the external parameters) due to a large error in the coordinates of the feature points.

Similarly, it is considered that when the error level of the values of the internal parameter is large, the error level of the feature points may become large. In this case, by decreasing the penalty of the error level as the error level $\theta(i, j, k)$ of the feature point increases as described above, it is possible to reduce the deterioration in the accuracy of the value of the external parameter (relatively improve the accuracy of the value of the external parameter) due to a large error in the values of the internal parameters.

For example, it is considered that when the resolutions of the plurality of cameras 2 are significantly different, such as when the respective resolutions of the visible camera and the far-infrared camera are significantly different, the calculation accuracy of the internal parameters such as the optical center of the camera and lens distortion differs depending on the resolution, and the calculation accuracy of the coordinates of the feature points may deteriorate due to the influence of the values of the internal parameters having a poor calculation accuracy, which may then cause the calculation accuracy of the external parameter to deteriorate.

In this case, by decreasing the penalty of the error level in the external parameter estimation unit 203 as the error of the feature points in an image increases as described above, it is possible to reduce the deterioration in the calculation accuracy of the external parameters (relatively improve the calculation accuracy of the external parameters) due to the values of the internal parameters having a poor calculation accuracy.

Camera Position Restriction Unit 206:

The camera position restriction unit 206 restricts, with respect to a relationship between two or more cameras, the relative positional relationship between camera postures from being inconsistent when a coordinate transformation related to rotation or translation is performed in a specified order of cameras.

More specifically, the error function represented by equation (4) may be minimized while imposing the following constraints. The first constraint is expressed by equation (5).

[Equation 5]

$$\Pi_i R_i = I \qquad (5)$$

Here, I represents the identity matrix.
The second constraint is expressed by equation (6).

[Equation 6]

$$\Pi_i T_i = 0 \qquad (6)$$

Note that 0 represents the zero matrix.

The camera position restriction means of the present invention is not limited to this. For example, the camera position restriction means may not only restrict the relative positional relationship between the camera postures from being inconsistent using equation (5) or equation (6), but may also first restrict the relative positional relationship between the camera postures from being inconsistent using equation (1) and equation (2), for example. More specifically, the relative positional relationship between the camera postures may be restricted using the following optimization function.

For example, equation (7) is firstly used to restrict the relative positional relationship between the camera postures from being inconsistent with respect to the rotational degrees of freedom.

[Equation 7]

$$E_R = |R_{i-1}{}^i - R_i R_{i-1}{}^T|^p \qquad (7)$$

Here, p is a parameter which is determined in advance by the user.

Then, equation (8) may be used to restrict the relative positional relationship of the camera postures with respect to the translational degrees of freedom.

[Equation 8]

$$E_R = |T_{i-1}{}^i - T_i + R_i R_{i-1}{}^T|^p \qquad (8)$$

[Description of Operation]

Next, the operation of the image processing device 3 will be described using FIG. 3.

Figure 3:
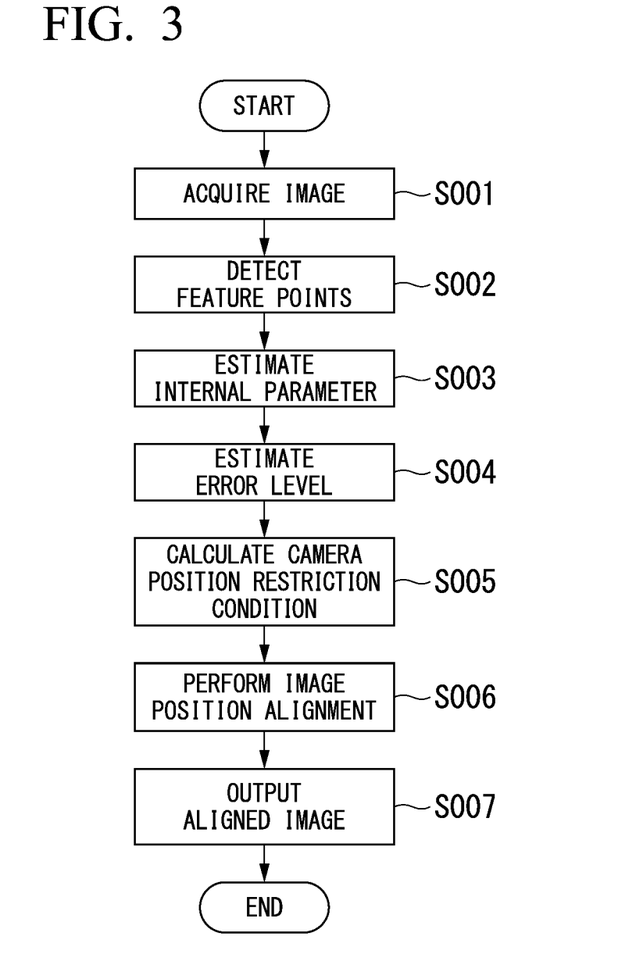
FIG. 3 is a flowchart showing an example of a processing procedure in which the image processing device according to the example embodiment performs image alignment and outputs an aligned image.

FIG. 3 is a flowchart showing an example of a processing procedure in which the image processing device 3 performs image alignment and outputs an aligned image.

In the processing of FIG. 3, the image acquisition unit 10 firstly acquires an image (S001).

Then, the feature point detection unit 201 detects feature points (S002). The internal parameter estimation unit 202 calculates an internal parameter (S003). The error level estimation unit 205 calculates an error level (S004). The camera position restriction unit 206 calculates a camera position restriction condition (S005). The image position alignment unit 204 outputs an aligned image (S006). The image output unit 30 outputs the aligned image (S007).

After step S007, the image processing device 3 ends the processing of FIG. 3.

[Description of Effects]

As described above, in the configuration of the image processing device 3 according to the example embodiment:

the image acquisition unit 10 acquires one or more captured images of a camera calibration target from one or more cameras;

the feature point detection unit 201 detects, from the one or more images obtained by the image acquisition unit 10, feature points to be used for calibration;

the error level estimation unit 205 calculates, for each camera used by the image acquisition unit 10, an error level of the feature point detection from the feature points detected by the feature point detection unit 201 and the camera images and camera information acquired by the image acquisition unit 10;

the internal parameter estimation unit 202 calculates the feature points detected by the feature point detection unit 201 and camera parameters such as lens distortion and the optical center; and the external parameter estimation unit 203 sets an error function so that the penalty of the error level in the external parameter estimation unit 203 decreases as the error of the feature points in an image increases, from the error level calculated by the error level estimation unit 205, the feature points detected by the feature point detection unit 201, and the internal parameter estimation unit 202, and calculates an external parameter such as the camera posture.

With the above configuration, camera calibration (such as the optical axis of each camera, lens distortion, the posture between cameras, and the like) between cameras having significantly different camera resolutions can be robustly calculated with a high accuracy.

Of the units of the image processing device 3 (FIG. 2), the combination of the image acquisition unit 10, the feature point detection unit 201, the internal parameter estimation unit 202, the external parameter estimation unit 203, the image position alignment unit 204, the error level estimation unit 205, and the camera position restriction unit 206 corresponds to an example of a camera calibration information acquisition device.

Figure 4:
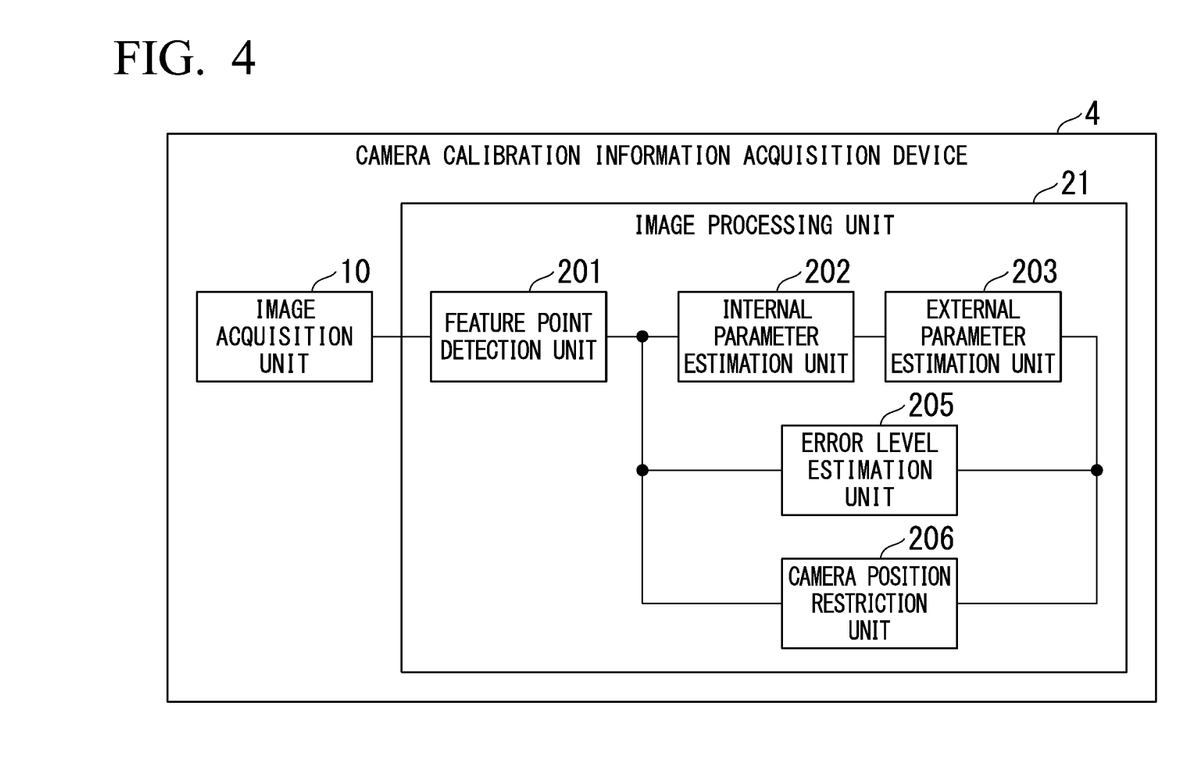
FIG. 4 is a schematic block diagram showing an example of a functional configuration of a camera calibration information acquisition device according to the example embodiment.

FIG. 4 is a schematic block diagram showing an example of a functional configuration of a camera calibration information acquisition device according to an example embodiment. In the configuration shown in FIG. 4, the camera calibration information acquisition device 4 includes an image acquisition unit 10 and an image processing unit 21. The image processing unit 21 includes a feature point detection unit 201, an internal parameter estimation unit 202, an external parameter estimation unit 203, an image position alignment unit 204, an error level estimation unit 205, and a camera position restriction unit 206.

Of the units shown in FIG. 4, units having the same functions as the units shown in FIG. 2 are designated by the same reference symbols (10, 201, 202, 203, 305, 206), and the description will be omitted.

The camera calibration information acquisition device 4 is different from the image processing device 3 in that an image output unit is not provided, and the image processing unit 21 is not provided with an image position alignment unit. Otherwise, the camera calibration information acquisition device 4 is the same as the case of the image processing device 3.

With the configuration shown in FIG. 4, the camera calibration information acquisition device 4 acquires the values of the internal parameters and the values of the external parameters as information for camera calibration, as in the case of the image processing device 3.

For example, the camera calibration information acquisition device 4 may transmit the obtained internal parameters and external parameters to another device. Then, the device that has received the internal parameters and the external parameters may perform the same processing as the image position alignment unit 204 (FIG. 2) by using the obtained internal parameters and external parameters.

Alternatively, the camera calibration information acquisition device 4 may display the obtained internal parameters and external parameters as information indicating the characteristics and state of the cameras.

As described above, the image acquisition unit 10 acquires images of a camera calibration target captured from two or more cameras 2. The feature point detection unit 201 detects, from each of the images acquired by the image acquisition unit 10, coordinates of feature points in the images. The internal parameter estimation unit 202 uses the feature points detected by the feature point detection unit 201 to calculate an internal parameter for each of the cameras. The error level estimation unit 205 calculates for each camera 2 a magnitude of error in the coordinates of the feature points detected by the feature point detection unit 201. The external parameter estimation unit 203 calculates the values of the external parameters of the cameras 2 by using the magnitude of the error calculated by the error level estimation unit 205, the coordinates of the feature points detected by the feature point detection unit 201, and an error function. The error function is set so that the penalty for error in calculating the external parameters decreases as the magnitude of the error in the coordinates of the feature points in an image increases.

As a result, according to the camera calibration information acquisition device 4, when the accuracy of the information obtained from the captured images differs depending on the camera, it is possible to reduce the decrease in camera calibration accuracy caused by the difference in accuracy.

In particular, according to the camera calibration information acquisition device 4, when the calculation accuracy of the coordinates of the feature points differs depending on the camera, the resulting decrease in the calculation accuracy of the external parameter (particularly due to coordinates of the feature points having a poor calculation accuracy) can be reduced. The same applies when the calculation accuracy of the internal parameter differs depending on the camera, and the calculation accuracy of the coordinates of the feature points differs accordingly.

The same applies to the image processing device 3 (FIG. 2).

Furthermore, the external parameter estimation unit 203 calculates, with respect to the relationship between two or more cameras, an external parameter under a restriction condition such that a relative positional relationship between camera postures is not inconsistent when a coordinate transformation related to rotation or translation is performed in a specified order of cameras.

As a result, the external parameter estimation unit 203 is capable of calculating the external parameters such that an inconsistency does not occur in the positional relationship between camera postures. In this respect, according to the camera calibration information acquisition device 4, the external parameters can be accurately calculated.

The same applies to the image processing device 3.

Furthermore, the image position alignment unit 204 of the image processing device 3 recalculates, in an overlapping area in which a plurality of images overlap, an image using pixel values of both images.

As a result, in the image processing device 3, it is possible to obtain an image in which the boundary regions are superimposed more smoothly.

Next, the configuration of an example embodiment will be described with reference to FIG. 5 to FIG. 6.

Figure 5:
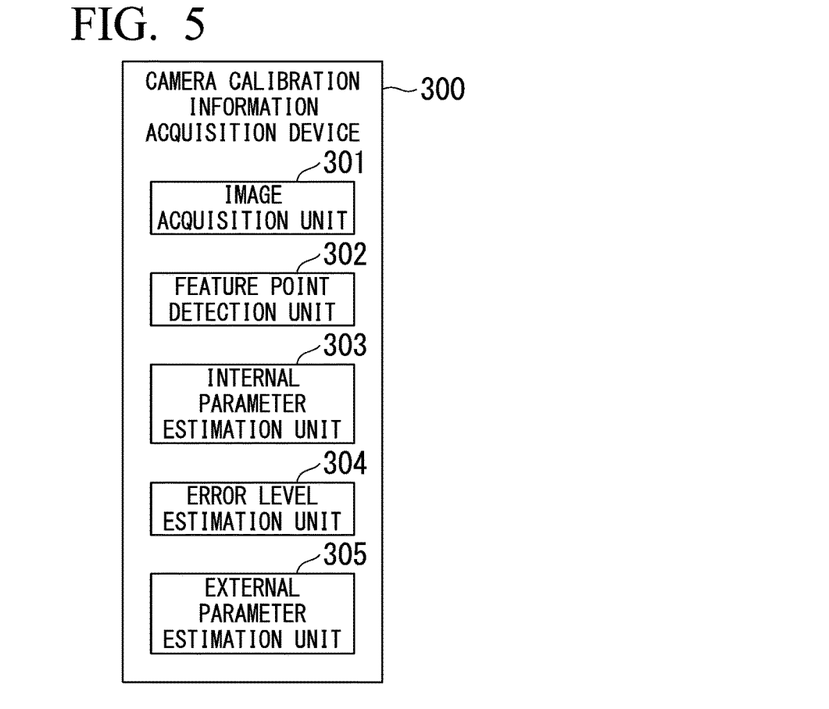
FIG. 5 is a diagram showing a configuration example of the camera calibration information acquisition device according to the example embodiment.

FIG. 5 is a diagram showing an example of the configuration of a camera calibration information acquisition device according to the example embodiment. The camera calibration information acquisition device 300 shown in FIG. 5 includes an image acquisition unit (image acquisition means) 301, a feature point detection unit (feature point detection means) 302, an internal parameter estimation unit (internal parameter estimation means) 303, an error level estimation unit (error level estimation means) 304, and an external parameter estimation unit (external parameter estimation means) 305.

In such a configuration, the image acquisition unit 301 acquires images of a captured camera calibration target from two or more cameras. The feature point detection unit 302 detects, from each of the images acquired by the image acquisition unit 301, the coordinates of feature points in the images. The internal parameter estimation unit 303 uses the feature points detected by the feature point detection unit 302 to calculate an internal parameter for each of the cameras. The error level estimation unit 304 calculates, for each camera, the magnitude of error in the coordinates of the feature points detected by the feature point detection unit 302. The external parameter estimation unit 305 calculates a value for an external parameter of the cameras by using the magnitude of the error calculated by the error level estimation unit 304, the coordinates of the feature points detected by the feature point detection unit 302, and an error function set so that a penalty for error in calculating the external parameter decreases as the error magnitude in the coordinates of the feature points in an image increases.

As a result, according to the camera calibration information acquisition device 300, when the accuracy of the information obtained from the captured images differs depending on the camera, it is possible to reduce the decrease in camera calibration accuracy caused by the difference in accuracy.

In particular, according to the camera calibration information acquisition device 300, when the calculation accuracy of the coordinates of the feature points differs depending on the camera, the resulting decrease in the calculation accuracy of the external parameter (particularly due to coordinates of the feature points having a poor calculation accuracy) can be reduced. The same applies when the calculation accuracy of the internal parameter differs depending on the camera, and the calculation accuracy of the coordinates of the feature point differs accordingly.

Figure 6:
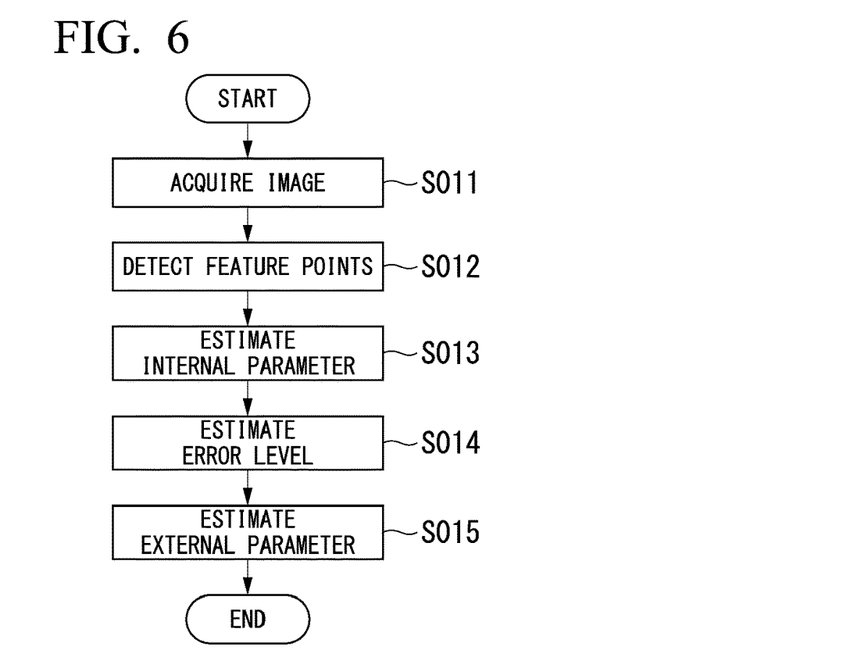
FIG. 6 is a diagram showing an example of a processing procedure of a camera calibration information acquisition method according to the example embodiment.

FIG. 6 is a diagram showing an example of the processing procedure of a camera calibration information acquisition method according to an example embodiment. The camera calibration information acquisition method shown in FIG. 6 includes: a step of acquiring images (S011); a step of detecting the coordinates of feature points (S012); a step of calculating an internal parameter (S013); a step of calculating a magnitude of error in the coordinates of feature points (S014); and a step of calculating the value of an external parameter (S015). In the step of acquiring images (S011), images of a camera calibration target captured from two or more cameras are acquired. In the step of detecting the coordinates of feature points (S012), the coordinates of the feature points of the images are detected from each of the images acquired in S011. In the step of calculating an internal parameter (S013), the feature points detected in step S012 are used to calculate the internal parameters of each camera. In the step of calculating a magnitude of error in the coordinates of feature points (S014), the magnitude of the error in the coordinates of the feature points detected in step S012 is calculated for each camera. In the step of calculating the value of an external parameter (S015), the value of an external parameter of the cameras is calculated by using the magnitude of the error calculated in step S014, the coordinates of the feature points detected in step S012, and an error function set so that a penalty for error in calculating the external parameter decreases as the magnitude of the error in the coordinates of the feature points in an image increases.

According to the camera calibration information acquisition method, when the accuracy of the information obtained from the captured images differs depending on the camera, it is possible to reduce the decrease in camera calibration accuracy caused by the difference in accuracy.

In particular, according to the camera calibration information acquisition method, when the calculation accuracy of the coordinates of the feature points differs depending on the camera, the resulting decrease in the calculation accuracy of the external parameter (particularly due to coordinates of the feature points having a poor calculation accuracy) can be reduced. The same applies when the calculation accuracy of the internal parameter differs depending on the camera, and the calculation accuracy of the coordinates of the feature points differs accordingly.

Figure 7:
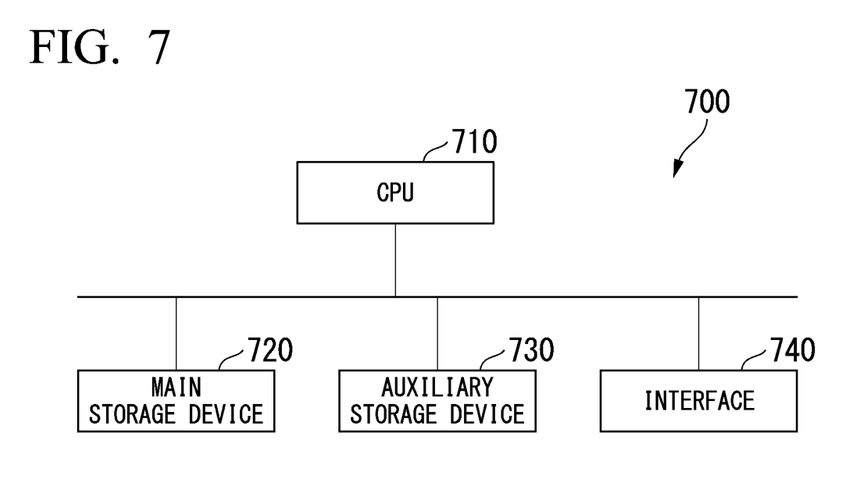
FIG. 7 is a schematic block diagram showing a configuration of a computer according to at least one example embodiment.

FIG. 7 is a schematic block diagram showing a configuration of a computer according to at least one example embodiment.

In the configuration shown in FIG. 7, the computer 700 includes a CPU 710, a primary storage device 720, an auxiliary storage device 730, and an interface 740.

Any one or more of the image processing device 3, the camera calibration information acquisition device 4, and the camera calibration information acquisition device 300 described above may be implemented by the computer 700. In this case, the operation of each of the processing units described above is stored in the auxiliary storage device 730 in the form of a program. The CPU 710 reads the program from the auxiliary storage device 730, expands the program in the main storage device 720, and executes the processing described above according to the program. Further, the CPU 710 secures a storage area corresponding to each of the storage units in the main storage device 720 according to the program.

The communication between the image processing device 3, the camera calibration information acquisition device 4, or the camera calibration information acquisition device 300 and other devices is executed as a result of the interface 740 having a communication function, and performing communication according to the control of the CPU 710. A user interface of the image processing device 3, the camera calibration information acquisition device 4, or the camera calibration information acquisition device 300 is executed as a result of the interface 740 including a display device and displaying data and including an input device and acceptting data inputs.

When the image processing device 3 is implemented in the computer 700, the operation of the image acquisition unit 10, the image processing unit 20, the image output unit 30, and each unit of the image processing unit 20 is stored in the auxiliary storage device 730 in the form of a program. The CPU 710 reads the program from the auxiliary storage device 730, expands the program in the main storage device 720, and executes the processing described above according to the program.

When the camera calibration information acquisition device 4 is implemented in the computer 700, the operation of the image acquisition unit 10, the image processing unit (image processing means) 21, and each unit of the image processing unit 21 is stored in the auxiliary storage device 730 in the form of a program. The CPU 710 reads the program from the auxiliary storage device 730, expands the program in the main storage device 720, and executes the processing described above according to the program.

When the camera calibration information acquisition device 300 is implemented in the computer 700, the operation of the image acquisition unit 301, the feature point detection unit 302, the internal parameter estimation unit 303, the error level estimation unit 304, and the external parameter estimation unit 305 is stored in the auxiliary storage device 730 in the form of a program. The CPU 710 reads the program from the auxiliary storage device 730, expands the program in the main storage device 720, and executes the processing described above according to the program.

Each unit of the image processing system may be realized by using a combination of hardware and software. In the case of a mode where hardware and software are combined, an image processing program is expanded in a RAM (random access memory), and hardware such as a control unit (CPU (central processing unit)) is operated based on the program, to thereby realizing each unit as various units. Furthermore, the program may be recorded on a recording medium and then distributed. The program recorded on the recording medium is read into the memory in a wired or wireless fashion, or via the recording medium itself, and operates the control unit and the like. Examples of the recording medium include optical disks, magnetic disks, semiconductor memory devices, hard disks, and the like.

Moreover, the specific configuration of the present invention is in no way limited to the example embodiments, and include modifications within a scope not departing from the spirit of the present invention.

The present invention has been described above with reference to the example embodiments. However, the present invention is not limited to the example embodiments above. Various changes to the configuration and details of the present invention that can be understood by those skilled in the art can be made within the scope of the present invention.

This application is based upon and claims the benefit of priority from Japanese patent application No. 2019-036372, filed Feb. 28, 2019, the disclosure of which is incorporated herein in its entirety by reference.

INDUSTRIAL APPLICABILITY

The present invention may be applied to a camera calibration information acquisition device, an image processing device, a camera calibration information acquisition method, and a recording medium.

REFERENCE SYMBOLS

1 Image processing system
2 Camera
3 Image processing device
4, 300 Camera calibration information acquisition device
10, 301 Image acquisition unit
20, 21 Image processing unit
30 Image output unit
201, 302 Feature point detection unit
202, 303 Internal parameter estimation unit
203, 305 External parameter estimation unit
204 Image position alignment unit
205, 304 Error level estimation unit
206 Camera position restriction unit

The invention claimed is:

1. A camera calibration information acquisition device comprising:
at least one memory configured to store instructions; and
at least one processor configured to execute the instructions to:
acquire captured images of a camera calibration target from two or more cameras;
detect, from each acquired image, a coordinate of a feature point in the image;
calculate an internal parameter for each camera by using the detected feature point;
calculate, for each camera, a magnitude of error in the coordinate of the detected feature point; and
calculate a value for an external parameter of the cameras by using the calculated magnitude of the error, the detected coordinate of the feature point, and an error function set so that a penalty for error in calculating the external parameter decreases as the magnitude of the error in the coordinate of the feature point in the image increases.

2. The camera calibration information acquisition device according to claim 1, wherein the at least one processor is configured to execute the instructions to calculate, with respect to a relationship between the two or more cameras, the external parameter under a restriction condition such that a relative positional relationship between camera postures is not inconsistent when a coordinate transformation related to rotation or translation is performed in a specified order of cameras.

3. An image processing device comprising:
the camera calibration information acquisition device according to claim 1,
wherein the at least one processor is configured to execute the instructions to:
align a position of the images acquired by each camera, by using the calculated internal parameter, and the calculated external parameter, to acquire an aligned image; and
output the aligned image.

4. The image processing device according to claim 3, wherein the at least one processor is configured to execute the instructions to recalculate, in an overlapping area in which a plurality of images overlap, an image using pixel values of both images.

5. A camera calibration information acquisition method comprising:
acquiring captured images of a camera calibration target from two or more cameras;
detecting, from each acquired image, a coordinate of a feature point in the image;
calculating an internal parameter for each camera by using the detected feature point;
calculating, for each camera, a magnitude of error in the coordinate of the detected feature point; and
calculating a value for an external parameter of the cameras by using the calculated magnitude of the error, the detected coordinate of the feature point, and an error function set so that a penalty for error in calculating the external parameter decreases as the magnitude of the error in the coordinate of the feature point in the image increases.

6. A non-transitory recording medium that stores a program for causing a computer to execute:
acquiring captured images of a camera calibration target from two or more cameras;
detecting, from each acquired image, a coordinate of a feature point in the image;
calculating an internal parameter for each camera by using the detected feature point;
calculating, for each camera, a magnitude of error in the coordinate of the detected feature point; and
calculating a value for an external parameter of the cameras by using the calculated magnitude of the error, the detected coordinate of the feature point, and an error function set so that a penalty for error in calculating the external parameter decreases as the magnitude of the error in the coordinate of the feature point in the image increases.

* * * * *